(12) United States Patent
Lund

(10) Patent No.: US 6,612,187 B1
(45) Date of Patent: Sep. 2, 2003

(54) MEASURING A GAS MASS FRACTION

(75) Inventor: Jonathan Stuart Lund, Ashby de la Zouch (GB)

(73) Assignee: BG Intellectual Property Limited, Reading (GB)

( * ) Notice: Subject to any disclaimer, the term of this patent is extended or adjusted under 35 U.S.C. 154(b) by 0 days.

(21) Appl. No.: 09/673,244

(22) PCT Filed: Apr. 22, 1999

(86) PCT No.: PCT/GB99/01237
§ 371 (c)(1),
(2), (4) Date: Oct. 23, 2000

(87) PCT Pub. No.: WO99/56091
PCT Pub. Date: Nov. 4, 1999

(30) Foreign Application Priority Data

Apr. 23, 1998 (GB) ............................................. 9808521
Sep. 16, 1998 (GB) ............................................. 9820074

(51) Int. Cl.$^7$ ............................. G01F 1/74; G01F 1/44
(52) U.S. Cl. ................................. 73/861.04; 73/861.63
(58) Field of Search ............................. 73/861.63, 861, 73/861.64, 861.04, 861.01

(56) References Cited

U.S. PATENT DOCUMENTS

| | | | | |
|---|---|---|---|---|
| 3,838,598 A | * | 10/1974 | Tompkins | ................ 73/205 L |
| 4,028,942 A | * | 6/1977 | Gardiner | ...................... 73/335 |
| 4,231,262 A | * | 11/1980 | Boll, deceased et al. | 73/861.04 |
| 4,324,143 A | | 4/1982 | Olson | |
| 5,226,728 A | * | 7/1993 | Vander Heyden | ............ 374/36 |
| 5,421,209 A | * | 6/1995 | Redus et al. | ............. 73/861.04 |
| 5,423,226 A | * | 6/1995 | Hunter et al. | ............ 73/861.63 |
| 5,576,495 A | * | 11/1996 | Vetterick | ................ 73/861.04 |
| 6,332,111 B1 | * | 12/2001 | Fincke | ........................ 702/45 |

FOREIGN PATENT DOCUMENTS

EP 0076882 A1 4/1983

OTHER PUBLICATIONS

Fincke, J.R. Performance characteristics of an extended throat flow nozzle for the measurement of high void fraction multi-phase flows. (http://www.fetc.doe.gov/publications/proceedings/99/99oil&gas/ngp7.pdf).*

* cited by examiner

Primary Examiner—Hezron Williams
Assistant Examiner—Lilybett Martir
(74) Attorney, Agent, or Firm—Oblon, Spivak, McClelland, Maier & Neustadt, P.C.

(57) ABSTRACT

A method of measuring a gas mass fraction (X) in a mass of liquid and gas flowing in direction (A) along pipeline (2) which includes a venturi formed by throat (10), convergent portion (12) and divergent portion (14). Adjacent the venturi (12, 10, 14) but upstream is a flow conditioner (28) creating a uniform mixture of gas and liquid downstream so as to reduce or avoid slip between the gas and liquid phases in the venturi. Differential pressure (DP1) is measured between a position upstream of the flow conditioner and a position intermediate the flow conditioner and venturi. Differential pressure (DP2) is measured between the throat and a position intermediate the flow conditioner and venturi. Differential pressure (DP3) is measured across the venturi. Computer (50) calculates the gas mass fraction (X) using a formula that may take the form: $X = a \cdot (DP1)^b \cdot (DP2)^c \cdot (DP3)^d \cdot (DP2-DP3)^e \cdot (DP1+DP3)^f$, in which a, b, c, d, e and f are constants.

7 Claims, 2 Drawing Sheets

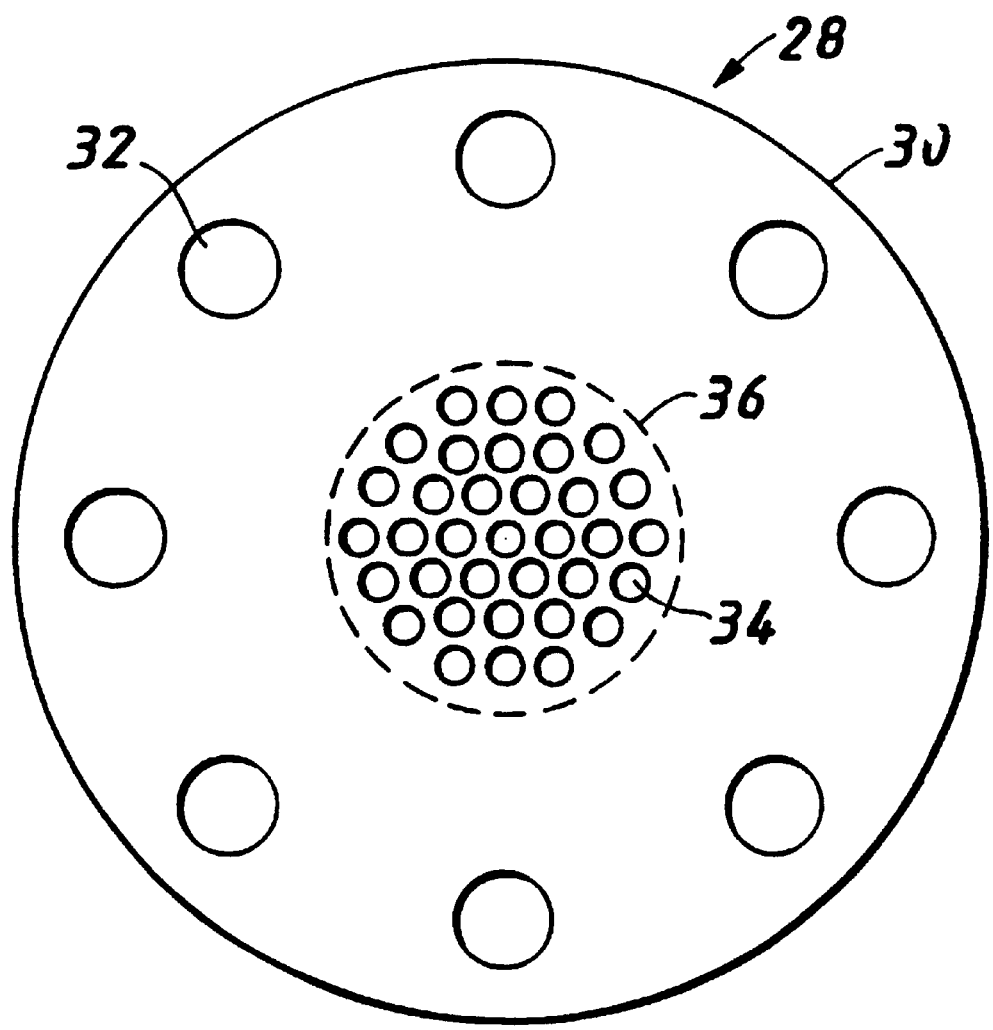

MEASURING A GAS MASS FRACTION

BACKGROUND OF THE INVENTION

1. Field of the Invention

This invention relates to a method and apparatus to measure a gas mass fraction.

2. Discussion of the Background

The numerical value of the gas mass fraction measured may be used in a calculation to give a numerical value of a gas mass flow rate in a multiphase flow, for example a wet gas flow comprising gas and liquid. Typically, wet gas comprises 90% or more of gas by volumetric flow under flow conditions.

The wet gas concerned may be fuel gas, for example natural gas, and liquid, for example oil and/or water, being piped from an oil or gas well.

Hitherto, the measurement of fluid flow from an oil or gas well has usually involved the use of a test separator to devise a value for the gas mass fraction which is the ratio of the gas mass flow to a total fluid (gas and liquid) flow. Test separation which is a batch process, is performed offshore in offshore oil and gas production, and if need for test separation can be obviated this can reduce offshore platform weight, process complexity and the manning requirement demanded by test separation.

An alternative to test separation is the use of expensive multi-phase flow meters, but these lose accuracy as the gas volume fraction increases.

An alternative to such multi-phase flow meters is the use of a venture for wet gas venturi flow metering in which a correction using either the Murdock or Chisholm formula is applied thereto to give the mass flow rate of the gas. However both the Murdock and Chisholm formulas require a derived value of the gas mass fraction proved by test separation using the test separator as referred to above, or by using a tracer technique which is also a batch process, or by gamma densitometry which is a continuous process.

SUMMARY OF THE INVENTION

An object of the invention is to provide a method of measuring a gas mass fraction in a mass of liquid and gas flowing along a pipeline, which may be a continuous process which when carried out avoids the need for test separation or for use of a tracer technique, or for use of gamma densitometry.

According to a first aspect of the invention a method of measuring a gas mass fraction X in a mass of liquid and gas flowing along a pipeline comprises providing a flow conditioner in the pipeline, providing adjacent to and downstream of the flow conditioner a venturi flow meter in-line with the pipeline so that fluid flow along the pipeline is through the flow conditioner and the venturi flow meter, making measurements of differential pressures across a plurality of portions along the flow conditioner and venturi flow meter combination, and using the measurements to calculate the gas mass traction X.

According to a second aspect of the invention a method of measuring a gas mass fraction X in a mass liquid and gas flowing along a pipeline comprises providing a venturi comprising a throat, an upstream portion converging towards the throat, and a downstream portion diverging away from said throat.

providing said venturi in-line with the pipeline such that fluid flow along the pipeline is through the venturi, providing a flow conditioner in the pipeline upstream of the venturi, said flow conditioner being adjacent to said venturi, making a measure of a differential pressure DP1 between a position upstream of the flow conditioner and a position intermediate the flow conditioner and the venturi, making a measure of a differential pressure DP2 between the throat and position intermediate the flow conditioner and the venturi, making a measure of a differential pressure DP3 between a position downstream of the venturi and a position intermediate the flow conditioner and the venturi, and calculating the gas mass fraction X using a formula of the type: (X=fn(DP1,DP2,DP3 . . . ) of which $X=a \cdot (DP1)^b \cdot (DP2)^c \cdot (DP3)^d \cdot (DP2-DP3)^e \cdot (DP1+DP3)^f$, in which a,b,c,d,e and f are constants, is one example

BRIEF DESCRIPTION OF THE DRAWINGS

Each aspect of the invention will now be further described, by way of example, with reference to the accompanying drawings in which:

FIG. 2 is a plan view of a flow conditioner, which can be used in the apparatus in FIG. 1.

DESCRIPTION OF THE PREFERRED EMBODIMENTS

Figure 1:
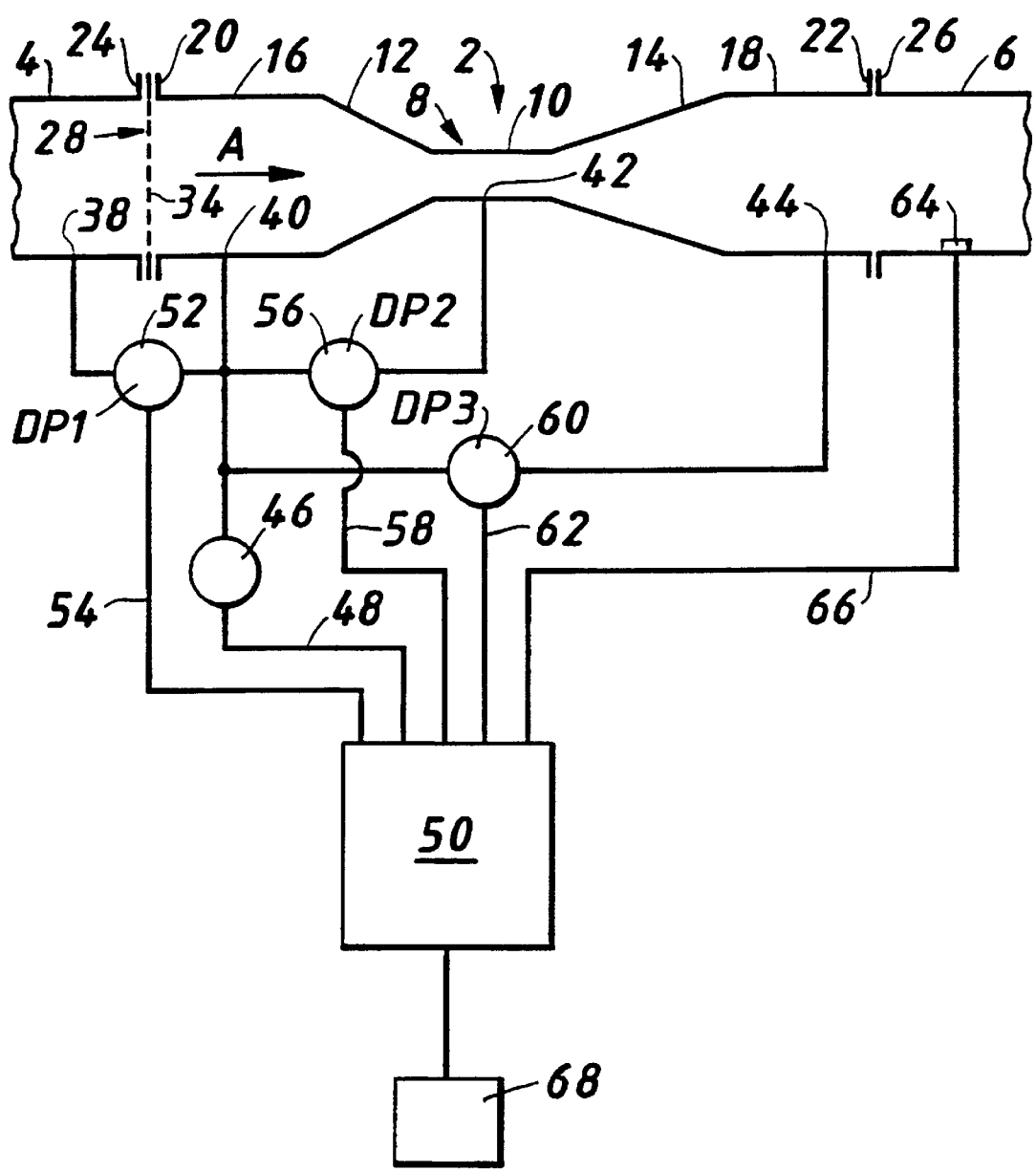
FIG. 1 is diagrammatic, and partially in section, and shows apparatus which can perform the method according to each aspect of the invention.

With reference to the drawings a substantially horizontal portion 2 of the pipeline is shown in FIG. 1 carrying a wet gas being a multiphase mixture of gas and liquid. The gas may be fuel gas for example natural gas, and the liquid may be oil and/or water, in which case the pipeline may be conveying the multi-phase mixture from an oil or gas well.

The pipeline section 2 comprises an upstream pipe section 4, a downstream pipe section 6, and a venturi member 8 which may be adapted from a known kind hitherto used in previously known wet gas venturi flow metering. The venturi member 8 comprises a throat 10, an upstream portion 12 converging towards the throat, and a downstream portion 14 diverging away from the throat. The venturi member 8 also comprises two cylindrical end portions 16 and 18 provided with respective end flanges 20 and 22 which may be secured by bolts (not shown) to an end flange 24 or 26 on the pipe section 4 or 6.

A fluid flow conditioner 28 in the form of a circular plate 30 extends across the interior of the pipeline upstream of the venturi member 8 and is secured between the flanges 20 and 24 by the bolts (not shown) passing through bolts holes 32. Fluid flow is in direction A along the pipeline, and the flow conditioner 28 is at substantially a right angle to the flow. The plate 30 of the flow conditioner has a plurality of holes 34 therein to allow passage of the fluid through the plate. The holes 34 can be of a straight-through cylindrical shape each having a square edge at its upstream and downstream end. The holes 34 can be so arranged that they substantially occupy the internal cross-section of the pipeline as indicated by dash line 36 representing the internal wall of pipe section 4 or venturi end portion 16. The flow conditioner 28 is adjacent to the venturi proper formed by throat 10 and the convergent and divergent portions 12 and 14.

One purpose of the flow conditioner 28 is to cause the liquid and gas phases of the multiphase fluid to mix substantially uniformly or homogenise so that downstream of the flow conditioner, at any given position along the venturi member 8, the liquid and gas phases are flowing at substantially the same speed, ie there is substantially no slip between the liquid and gas through the venturi member.

Another purpose of the flow conditioner 28 is to cause a pressure drop thereacross.

Openings 38, 40, 42 and 44 are formed through the pipeline wall at the venturi member 8 and provides a signal representative thereof on line 48 to a computer 50.

A pressure transducer 52 observes a differential pressure DP1 upstream of the venturi 12, 10, 14 and across the flow conditioner 28 and sends a representative signal on line 54 to the computer 50. Another transducer 56 observes a differential pressure DP2 between the upstream end of the venturi apparatus 8 and the throat 10 and sends signals to the computer via line 58. A differential pressure DP3 across the venturi is observed by pressure transducer 60 and signals indicative of the differential pressure DP3 are sent to computer 50 via line 62.

A temperature sensor 64 observes the temperature of the fluid in the pipeline 2 and signals the reading to the computer 50 via line 66.

Gas mass fraction X is the ratio of gas mass flow along the pipeline 2 to total (liquid+gas) mass flow along the pipeline.

To determine the gas mass fraction X the computer 50 makes a calculation using the formula: $X = a \cdot (DP1)^b \cdot (DP2)^c \cdot (DP3)^d \cdot (DP2-DP3)^e \cdot (DP1+DP3)$ — I in which a,b,c,d,e and f are constants.

The calculated value X of the mass fraction may be input to an indicating/recording device 68.

The values of a, b, c, d, e and f may be calculated by any suitable mathematical technique, for example regression analysis, in which different known mixtures of gas and liquid giving different known values for X are fed down a pipeline arrangement as in FIG. 1 and the values of DP1, DP2 and DP3 observed are applied to the formula at I to derive values for a,b,c,d,e and f which fit.

Using known wet gas venturi flow metering methods, the venturi apparatus 8 is used to give a value for indicated gas mass flow $Q_g$ along the pipeline 2. The true gas mass flow $Q_g$ can be obtained using the Murdock correlation in a form of the formula adapted for use with venturi meters $$\frac{Q_g}{Q_{gi}} = \frac{1}{\left[1 + M \cdot \frac{(1-X) \cdot C_{DG}}{X \ C_{DL}} \sqrt{\frac{1_g}{1_L}}\right]} \quad \text{II}$$

In formula II, X is the gas mass fraction, M is the Murdock constant determined in known manner for the venturi, CDG is analogous to the coefficient of discharge of gas through an orifice plate, CDL, is analogous to the coefficient of discharge of liquid through that orifice plate and $$\frac{C_{DG}}{C_{DL}}$$

has a value substantially equal to unity. Thus when formula II is rearranged, true gas mass flow $Q_g$ is derived from the formula:

$$Q_g = \frac{Q_{gi}}{1 + \left[M \cdot \frac{(1-X)}{X} \sqrt{\frac{1_g}{1_L}}\right]} \quad \text{III}$$

in which $1_L$ is the density value of the liquid either measured and supplied to the computer 50 or corrected in the computer for the temperature measured by sensor 64, and $1_G$ is the density of the gas calculated by the computer at the pressure and temperature observed by transducer 46 and sensor 64.

The computer 50 uses the formula at III to calculate the true gas mass flow $Q_g$ which may be indicated and or recorded by the device 68.

The aforedescribed method and system provides a method of continuously calculating the gas mass fraction X using formula I and measuring the true gas flow $Q_g$ by formula III which true gas mass flow may be integrated with respect to time to give total gas mass supplied over a given time period.

Any suitable form of flow conditioner 28 may be used with a view to reducing slip, or creating no slip, between the gas and liquid phases in the venturi. For different diameters of pipeline the number of fluid passage holes in the flow conditioner may vary as may their size.

It will be appreciated that other equations are available for deriving $Q_g$ from $Q_{g1}$ and X; Chisholm for example.

What is claimed is:

1. A method of measuring a gas mass fraction in a mass of liquid and gas flowing along a pipeline, the method comprising the steps of:
   providing a flow conditioner in the pipeline;
   providing adjacent to and downstream of the flow conditioner a venturi member in-line with the pipeline such that flow of both liquid and gas phases of the mass of liquid and gas along the pipeline is through the flow conditioner and the venturi member;
   making measurements of differential pressure across a plurality of portions along the flow conditioner and venturi member combination; and
   using the measurements to calculate the gas mass fraction as a function of differential pressure.

2. A method as claimed in claim 1, wherein said flow conditioner includes a plurality of holes arranged to cause mixing of gas and liquid phases such that in the venturi member downstream of flow conditioner the slip between the gas and liquid phases is reduced compared with that upstream of the flow conditioner.

3. A method as claimed in claim 2, wherein in the venturi member there is substantially no slip between the gas and liquid phases.

4. A method of measuring a gas mass fraction in a mass of liquid and gas flowing along a pipeline, the method comprising the steps of:
   providing a venturi comprising a throat, an upstream portion converging towards the throat, and a downstream portion diverging away from said throat;
   providing said venturi in-line with the pipeline such that fluid flow along the pipeline is through the venturi;
   providing a flow conditioner in the pipeline upstream of the venturi, said flow conditioner being adjacent to said venturi, wherein both liquid and gas phases of the mass of liquid and gas flows through the flow conditioner;
   measuring a differential pressure DP1 between a position upstream of the flow conditioner and a position intermediate the flow conditioner and the venturi;
   measuring a differential pressure DP2 between the throat and a position intermediate the flow conditioner and the venturi;
   measuring a differential pressure DP3 between a position downstream of the venturi and a position intermediate the flow conditioner and the venturi; and
   calculating the gas mass fraction as a function of the differential pressures DP1, DP2, and DP3.

5. A method of measuring a true gas mass flow $Q_g$, the method comprising the steps of:
   measuring a gas mass fraction X in a mass of liquid and gas by, providing a flow conditioner in a pipeline, providing adjacent to and downstream of the flow conditioner a venturi member in-line with the pipeline such that flow of both liquid and gas phases of the mass of liquid and gas along the pipeline is through the flow conditioner and the venturi member, making measurements of differential pressure across a plurality of portions along the flow conditioner and venturi member combination, and using the measurements of differential pressure to calculate the gas mass fraction X as a function of differential pressure; and using the following version of the Murdock correlation adapted for use in wet gas venturi flow metering, the aforesaid version taking the form of the formula:

$$Q_g = \frac{Q_{gi}}{1 + \left[ M \cdot \frac{(1-X)}{X} \sqrt{\frac{1_g}{1_L}} \right]}$$

wherein X is the measured gas mass fraction, $1_g$ is the density of the gas, $1_L$ is the density of the liquid, $Q_{gi}$ is an indicated gas mass flow derived by wet gas venturi flow metering, and M is the Murdock constant derived for a venturi member used for said wet gas venturi flow metering.

6. A method of measuring a true gas mass flow $Q_g$ as claimed in claim 5, in which the indicated gas mass flow $Q_{gi}$ is derived from a wet gas venturi flow metering method using said venturi member.

7. A method of measuring a gas mass fraction X in a mass of liquid and gas flowing along a pipeline, the method comprising the steps of:

providing a venturi comprising a throat, an upstream portion converging towards the throat, and a downstream portion diverging away from said throat;

providing said venturi in-line with the pipeline such that fluid flow along the pipeline is through the venturi;

providing a flow conditioner in the pipeline upstream of the venturi, said flow conditioner being adjacent to said venturi, wherein both liquid and gas phases of the mass of liquid and gas flows through the flow conditioner;

measuring a differential pressure DP1 between a position upstream of the flow conditioner and a position intermediate the flow conditioner and the venturi;

measuring a differential pressure DP2 between the throat and a position intermediate the flow conditioner and the venturi;

measuring a differential pressure DP3 between a position downstream of the venturi and a position intermediate the flow conditioner and the venturi; and calculating the gas mass fraction X according to the formula $X = a \cdot (DP1)^b \cdot (DP2)^c \cdot (DP3)^d \cdot (DP2-DP3)^e \cdot (DP1+DP3)^f$, wherein a, b, c, d, e, and f are constants calculated by mathematical regression.

* * * * *